United States Patent
Pardeshi et al.

(10) Patent No.: US 12,450,438 B1
(45) Date of Patent: Oct. 21, 2025

(54) RELATION EXTRACTION FROM TEXT-BASED DOCUMENTS

(71) Applicant: Amazon Technologies, Inc., Seattle, WA (US)

(72) Inventors: Sonal R. Pardeshi, Redmond, CA (US); Vittorio Castelli, Croton-on-Hudson, NY (US); Bonan Min, Palo Alto, CA (US); Kishaloy Halder, Issaquah, WA (US); Yogarshi Paritosh Vyas, Brooklyn, NY (US); Venkatesh Nagapudi, San Jose, CA (US); Kapil Singh Badesara, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 207 days.

(21) Appl. No.: 18/478,616

(22) Filed: Sep. 29, 2023

(51) Int. Cl.
  G06F 40/295 (2020.01)
  G06F 40/109 (2020.01)

(52) U.S. Cl.
  CPC .......... *G06F 40/295* (2020.01); *G06F 40/109* (2020.01)

(58) Field of Classification Search
  CPC ..... G06F 40/295; G06F 40/109; G06F 16/288
  See application file for complete search history.

(56) References Cited

U.S. PATENT DOCUMENTS

| | | | | |
|---|---|---|---|---|
| 9,224,103 | B1* | 12/2015 | Subramanya | G06N 20/00 |
| 11,393,141 | B1* | 7/2022 | Hsu | G06N 5/025 |
| 2015/0356198 | A1* | 12/2015 | D'Souza | G16H 50/20 |
| | | | | 705/2 |
| 2023/0351111 | A1* | 11/2023 | Fauqueur | G06F 16/367 |

* cited by examiner

Primary Examiner — Yogeshkumar Patel
(74) Attorney, Agent, or Firm — Knobbe, Martens, Olson & Bear, LLP (57) ABSTRACT

Systems and methods are provided for generating a set of entity data items using an entity recognition model and text of a document, wherein a first entity data item of the set of entity data items represents a first entity mention in the text, and wherein a second entity data item of the set of entity data items represents a second entity mention in the text; generating augmentation data regarding one or more layout properties of the text; generating a set of relation data items using the set of entity data items, the augmentation data, and a relation detection model, where a first relation data item of the set of relation data items represents a relation between the first entity mention and the second entity mention; and generating, using the set of relation data items, a user interface configured to present relations between entities in the text.

20 Claims, 7 Drawing Sheets

RELATION EXTRACTION FROM TEXT-BASED DOCUMENTS

BACKGROUND

Models representing data relationships and patterns, such as functions, algorithms, systems, and the like, may accept input, and produce output that corresponds to the input in some way. For example, an input may represent a data entity and include various features of the data entity. A model may be trained to classify data entities into one of multiple classes based on a set of training data that includes inputs and corresponding classes to which the training data input vectors are to classified.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any specific element or act, the most significant digit(s) in a reference number typically refers to the figure number in which that element is first introduced.

DETAILED DESCRIPTION

The present disclosure relates to extracting relationships among entities mentioned in text, including text from semi-structured documents.

As used herein, the terms "entity" and "entity type" are used in accordance with their usual and customary meaning in the field of natural language processing. Entity type refers to a particular class or category of real-world entities. Examples of entity types include "person," "organization," and "position." An entity is an instance of a real-world entity of a particular entity type. "John Smith" would be an example of a "person" entity. Entity mention refers to a span in text that mentions an entity. Note that there can be multiple mentions of a single entity in a document, and the mentions may or may not include the same text. For example, two text spans "John Smith" and "he" are both entity mentions of the same entity "John Smith," which is a "person" entity type.

As used herein, the terms "relation" and "relation type" are used in accordance with their usual and customary meaning in the field of natural language processing. Relation refers to a particular association between a pair of entities. Relation type refers to a particular class or category of relationship between two entities. For example, in the relation <John Smith, has_title, CEO>, the relation type is "has_title." In general, any two entity mentions may be considered to have the relation type "no_relation" unless their context indicates some relation type from a taxonomy. Each relation type is defined over pairs of entity type sets. For example, the "employee_of" relation can apply between entities of entity type "person" and entities of entity type "organization." Relation mention refers to a span of text that mentions a relation (e.g., "John Smith is the CEO."). If the relation appears multiple times in a document, each occurrence may be treated as a separate relation mention.

Generally described, relationship extraction is the task of extracting semantic relationships from a text. Extracted relationships may occur between two or more entities of a certain type (e.g., person, organization, job, etc.) and may fall into one or more of a set of semantic categories (e.g., "spouse_of," "employed_by," "position_held," etc.). Conventional relationship extraction methods typically involve the detection and classification of predefined semantic relationship mentions within a set of artifacts from plain text, such as prose in the form of sentences and paragraphs, or from structured documents, such as JavaScript Object Notation (JSON) documents, Extensible Markup Language (XML) documents, and the like. However, use of plain text and/or reliance on standardized structured document definitions may not be effective when dealing with semi-structured documents, and fails to take into account additional signals and features that may be found in semi-structured documents. Moreover, limiting relation extraction to a set of predefined semantic relationship mentions can limit the extensibility and overall usefulness of a relationship extraction system.

Some aspects of the present disclosure address some or all of the issues noted above, among others, by leveraging signals and features found in semi-structured documents to improve relationship extraction from such documents. As used herein, the term "semi-structured document" refers to a document or other set of text with at least some structural elements, such as spatial positioning, font variance, and the like. Such a document may be contrasted with plain text, which does not include any variation in font, spatial positioning, etc. Semi-structured documents may further be contrasted with structured documents, which are typically produced according to a standard specification and/or using a defined language (e.g., JSON, XML) in which each feature of the text is defined according to the specification. In contrast, semi-structured documents include non-standard forms, forms of unknown specification, richly-formatted text, and the like. In some embodiments, to accurately extract relations between entities in semi-structured documents, layout data about the spatial and/or visual properties of the text may be used during entity recognition and/or relationship extraction. For example, coordinates (e.g., x and y coordinates according to a Cartesian coordinate system) may be attached to or otherwise considered with the text at the coordinate location. As another example, font properties (e.g., color, size, font type, etc.) may be attached to or otherwise considered with the text exhibiting the font properties. When text is input into a named entity recognition subsystem, or when entities are input into a relation extraction subsystem, the input may be augmented ("decorated")

with metadata regarding the spatial and/or visual properties of the text. When a named entity recognition model or relation extraction model is trained to consider such augmentation data, the output may be more accurate due to the relevance of such data to the relationship between entities. For example, text that is largest on a form, or text in a certain location (e.g., top, center, etc.) on the form may be a span representative of an entity with which other entities are related.

Additional aspects of the present disclosure relate to providing a service that allows users to submit documents annotated with entities and relations. The service may use the annotated data to train entity recognition and/or relation extraction models that are customized for the user's data. For example, one user may employ the service to train and use models for extracting relations from legal documents (e.g., contracts, case law, etc.), while another user may employ the service to train and use models for extracting relations from financial documents (e.g., financial statements, tax documents, etc.).

Further aspects of the present disclosure relate to providing output that represents relations extracted from documents. In some embodiments, a user interface may be generated that displays the entities and relations extracted from a document or corpus of text. For example, the user interface may present text marked up or otherwise visually enhanced to indicate the entities and relations. As another example, a graph data structure may be visually presented to illustrate the entities and relations in the text. Nodes of the graph may be used to represent entities, and edges may be used to represent relations between entities.

Various aspects of the disclosure will be described with regard to certain examples and embodiments, which are intended to illustrate but not limit the disclosure. Although aspects of some embodiments described in the disclosure will focus, for the purpose of illustration, on particular components, modules, and subsystems of a natural language processing system, the examples are illustrative only and are not intended to be limiting. In some embodiments, the techniques described herein may be applied to additional or alternative types of components, modules, and subsystems of a natural language processing system. Additionally, any feature used in any embodiment described herein may be used in any combination with any other feature or in any other embodiment, without limitation.

Example Network Environment

Figure 1:
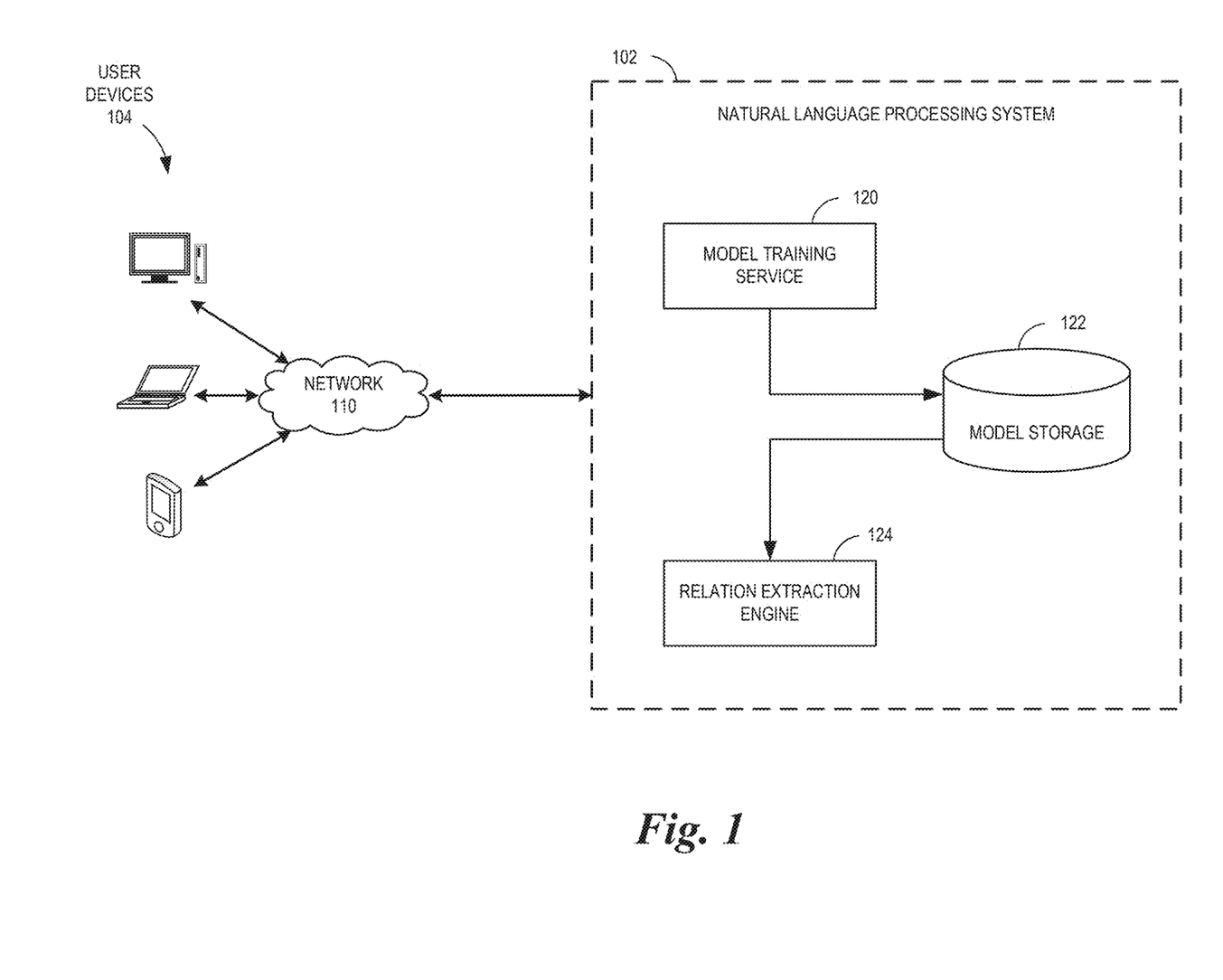
FIG. 1 is a block diagram of an illustrative computing environment including a natural language processing system with a relation extraction engine according to some embodiments.

FIG. 1 shows a network environment including a natural language processing system 102 and various user devices 104 in communication a communication network 110.

A communication network 110—also referred to simply as a "network"—may be a publicly accessible network of linked networks, possibly operated by various distinct parties, such as the internet. In other embodiments, a network 110 may include a private network, personal area network, local area network, wide area network, cable network, satellite network, cellular telephone network, etc. or a combination thereof, some or all of which may or may not have access to and/or from the internet.

The individual user devices 104 may be any of a wide variety of computing devices, including personal computing devices, terminal computing devices, laptop computing devices, tablet computing devices, electronic reader devices, wearable computing devices, mobile devices (e.g., smart phones, media players, handheld gaming devices, etc.), and various other electronic devices and appliances. A user device 104 may be used to provide documents or other text data to the natural language processing system 102 for extraction of entity relations, to provide annotated data to the natural language processing system 102 for training of entity recognition and entity relation extraction models, etc.

The natural language processing system 102 may include various components for providing the features described herein. Illustratively, the natural language processing system 102 may include a relation extraction subsystem, also referred to as a relation extraction engine 124, to process documents and other sets of text data and extract entity relations. The natural language processing system 102 may also include a model training subsystem, also referred to as a model training service 120, to train models used in entity recognition and/or relation extraction. The natural language processing system 102 may further include a model storage 122 to store one or more models used in relation extraction. The example components and data stores of the natural language processing system 102 shown in FIG. 1 are illustrative only, and are not intended to be limiting, required, or exhaustive. In some embodiments, a natural language processing system 102 may have fewer, additional, and/or alternative components and data stores.

Figure 6:
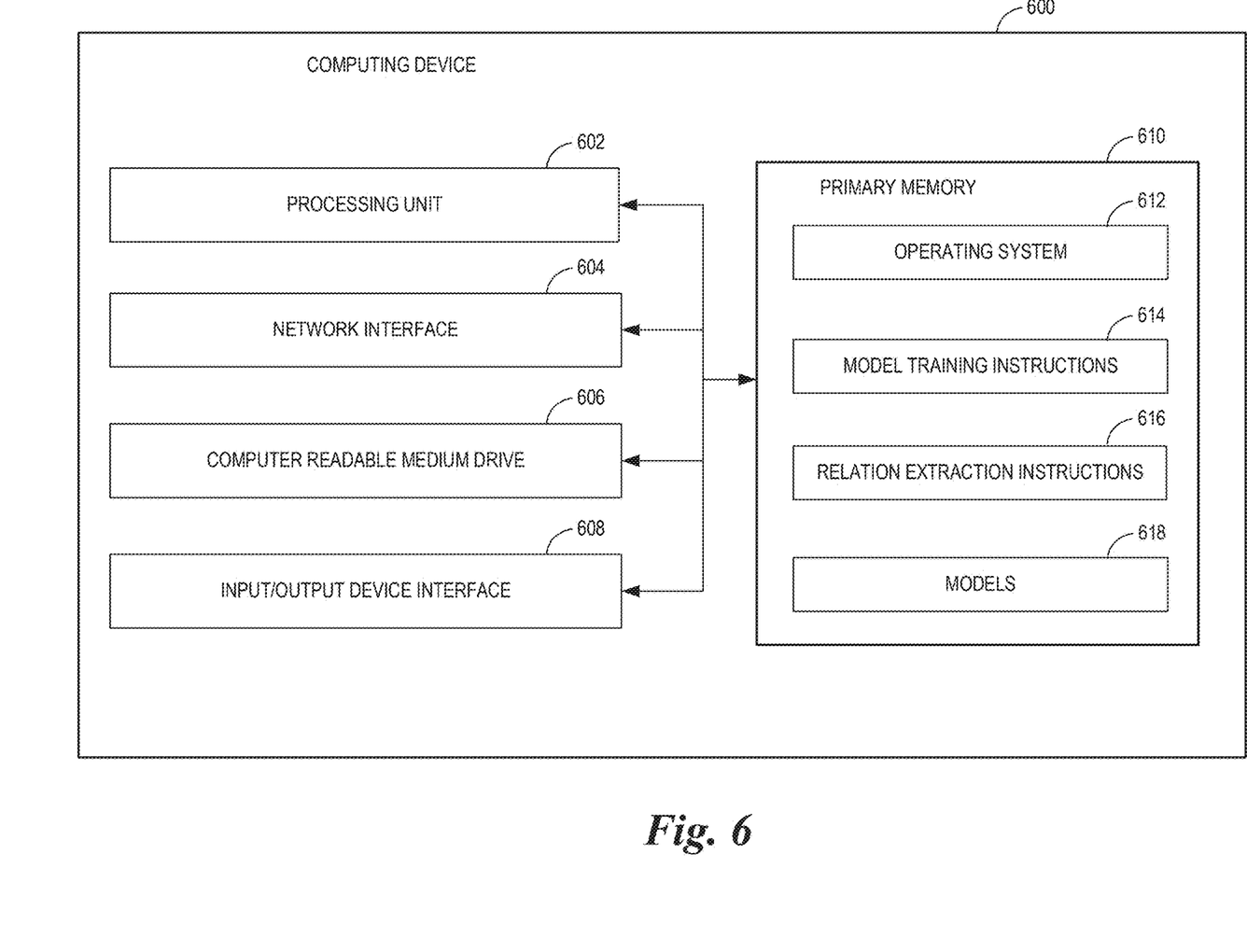
FIG. 6 is a block diagram of an illustrative computing device that may be configured to provide relation extraction functionality according to some embodiments.

The natural language processing system 102 may be implemented on one or more physical server computing devices that provide computing services and resources to user devices 104. In some embodiments, the natural language processing system 102 (or individual components thereof, such as the model training service 120, relation extraction engine 124, model storage 122, etc.) may be implemented on one or more host devices, such as blade servers, midrange computing devices, mainframe computers, desktop computers, or any other computing device configured to provide computing services and resources. For example, a single host device may execute one or more model training service components, one or more relation extraction components, one or more data stores, some combination thereof, etc. The natural language processing system 102 may include any number of such hosts. FIG. 6 illustrates an example computing device that may be used, as described in greater detail below.

In some embodiments, the features and services provided by the natural language processing system 102 may be implemented as web services consumable via communication network 110. In further embodiments, the natural language processing system 102 (or individual components thereof) is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

With reference to an illustrative embodiment, the natural language processing system 102 may facilitate the customized training of one or more models to recognize entities of particular interest to a user and/or to recognize relations of particular interest to a user. For example, a user may submit a corpus of annotated documents. The documents may be annotated with the particular entities and relations of interest to the user, which may include or be completely different from any set of entities or relations that the natural language processing system 102 may be configured to recognize for other users. The model training service 120 may use the corpus of annotated documents to train an entity recognition model and/or relation extraction model for the user's specific entities and relations. Advantageously, the model training service 120 may be configured to automatically analyze semi-structured documents for layout properties that may aid in recognizing entities or extracting relations between entities.

Figure 2:
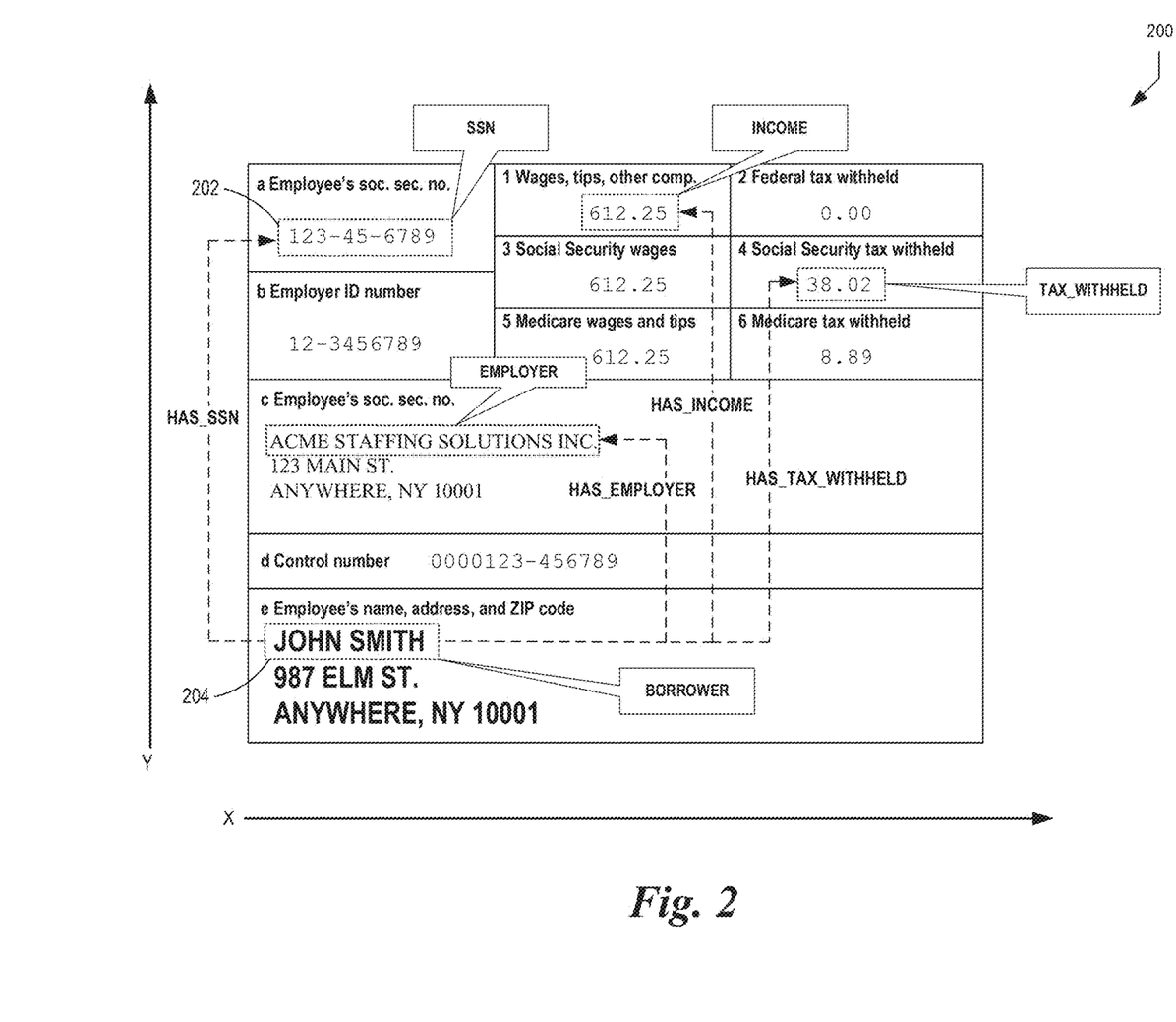
FIG. 2 illustrates a semi-structured document in which relations may be extracted according to some embodiments.

FIG. 2 illustrates an example document 200 that may be received in a corpus of annotated documents for use in training. The illustrated document 200 is a semi-structured document in that it is not plaintext, and is not organized and formatted according to a predetermined computer-readable specification (e.g., JSON or XML), but rather is a collection of textual elements whose meaning may depend on absolute spatial location, relative spatial location with respect to other textual elements, font properties, or the like. For example, the position of a textual element 202 in an upper-left box may be indicative of a particular entity type (e.g., a person identifier, such as a social security number or "SSN"), while the position and font size of a textual element 204 in the primary lower box may be indicative of another entity type (e.g., a person).

In the illustrated example, the document 200 is a tax document for a potential borrower (e.g., a person applying for a loan). A user of the natural language processing system 102 desires to have a model trained to recognize entities— and relations between entities—specific to their application: analyzing loan applications. The document 200 has been annotated with the locations and entity types of particular entities, and the relations between those entities. For example, document 200 includes annotations, using dotted outlines and balloons, for entities "John Smith" (a "borrower" entity type), "Acme Staffing Solutions Inc." (an "employer" entity type), "123-45-6789" (a "SSN" entity type), "612.25" (an "income" entity type), and "38.02" (a "tax_withheld" entity type). The document 200 has also been annotated, using dashed lines and text labels, with relations between the entities, such as <John Smith, has_employer, Acme Staffing Solutions Inc.>, <John Smith, has_income, 612.25>, <John Smith, has_SSN, 123-45-6789>, <John Smith, has_tax_withheld, 38.02>, and so on.

In the example document 200, the model training service 120 may extract or generate spatial location information for any or all of the entities. For example, the model training service 120 may determine x and y coordinates of each entity according to a coordinate system in which the x value indicates units of distance (in terms of pixels, inches, centimeters, etc.) from the left edge of the document and a y value that indicates units of distance from the top edge of the document. As another example, the model training service 120 may extract or generate one or more visual properties of any or all of the entities, such as font size, font type, font alterations (e.g., bolding/underlining/italics/strikethrough), font color, other properties, or any combination thereof. The spatial information, visual properties, or other layout properties may be used to augment the textual entities themselves to improve entity recognition or relation extraction in semi-structured documents, as described in greater detail below.

When an entity recognition or relation extraction model is trained for a particular user, the model(s) may be stored in the model storage 122 and made available for use by the relation extraction engine 124 for subsequent testing and/or production inference of additional documents, as described in greater detail below.

Example Entity Relation Extraction

Figure 3:
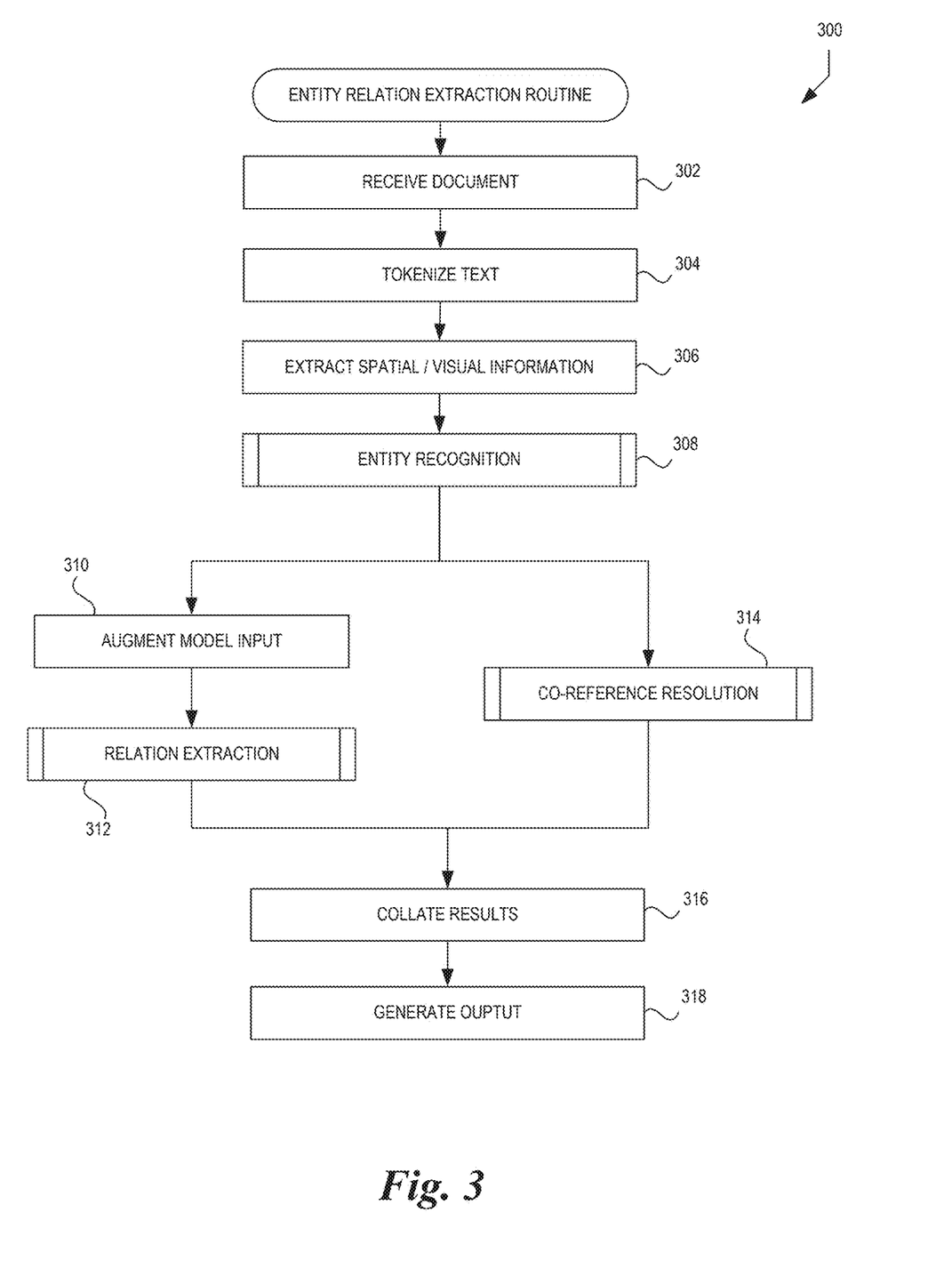
FIG. 3 is a flow diagram of an illustrative routine for relation extraction according to some embodiments.

FIG. 3 illustrates an example routine 300 that may be used to extract entity relations from a document or other set of text. The routine 300 may be executed by the relation extraction engine 124 or some other module, component, or subsystem of the natural language processing system 102.

The routine 300 will be described with further reference to the illustrative semi-structured document illustrated in FIG. 2, and the illustrative data flows and interactions illustrated in FIG. 4. In some embodiments, the output of the routine 300 may be used to generate a user interface, such as the example user interfaces shown in FIGS. 5A and 5B.

Routine 300 may be computer-implemented method that begins in response to an event, such as when the relation extraction engine 124 begins operation. When the routine 300 is initiated, a set of executable program instructions stored on one or more non-transitory computer-readable media (e.g., hard drive, flash memory, removable media, etc.) may be loaded into memory (e.g., random access memory or "RAM") of a computing device, such as the computing device 600 shown in FIG. 6 and described in greater detail below. In some embodiments, the routine 300 or portions thereof may be implemented on multiple processors, serially or in parallel.

At block 302, the relation extraction engine 124 may receive a document or other set of text to be analyzed for entity relations. In general, any set of text may be referred to as a document. For example, a document may be or include a single plaintext sentence or set of words, a multi-page set of free-form plaintext, a structured set of text organized according to a predetermined specification, a semi-structured set of text with spatial and/or visual properties that may be indicative of entities and/or relations, other sets of text, or any combination thereof. FIG. 2 illustrates an example semi-structured document 200 that may be received by the relation extraction engine 124 for analysis.

At block 304 of routine 300, the relation extraction engine 124 may tokenize the text in the input document. Tokenizing the text may involve determining the individual words or sentences in the document (e.g., based on whitespace between spans of text, punctuation, using a dictionary of known words, etc.).

Figure 4:
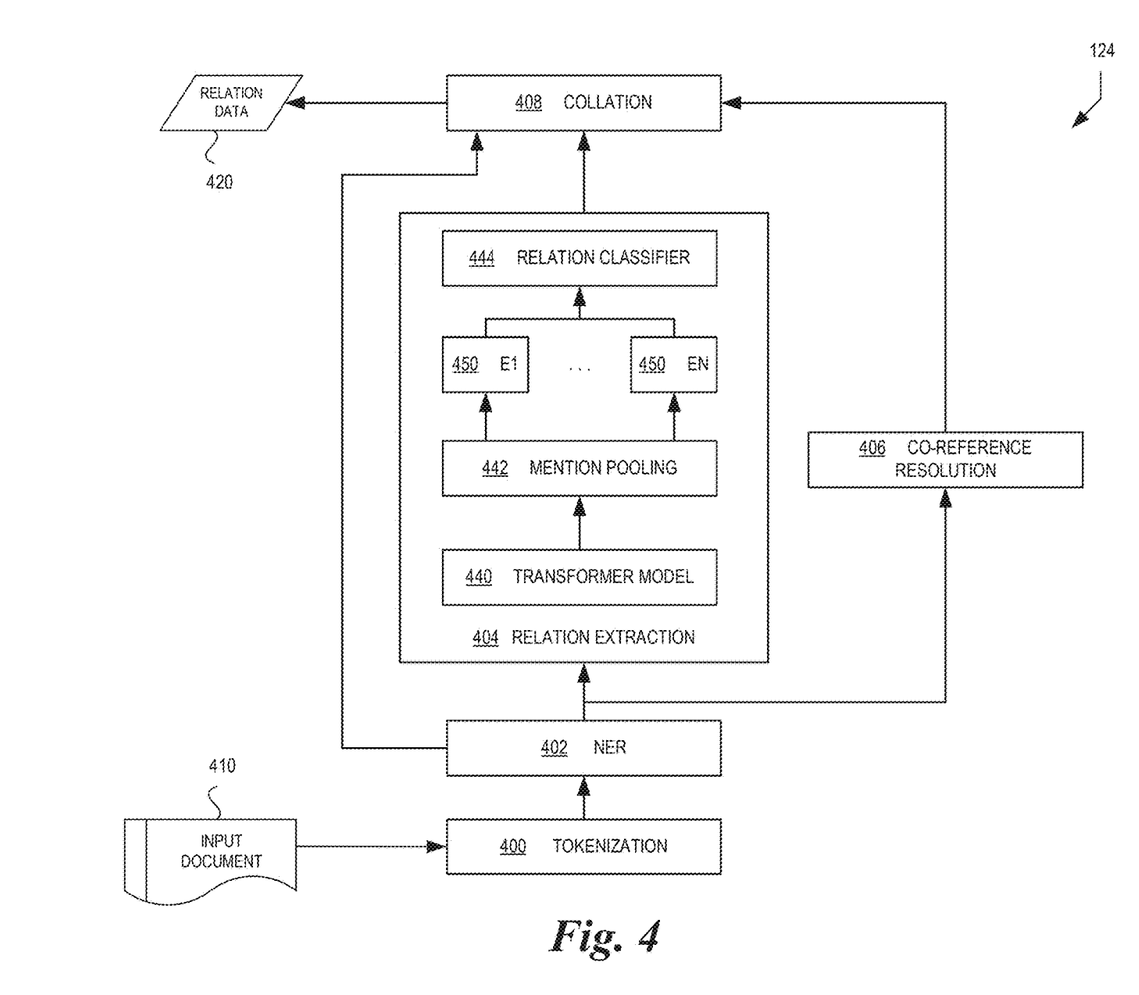
FIG. 4 is a block diagram illustrating data flows and interactions between components of a relation extraction engine according to some embodiments.

FIG. 4 illustrates data flows and interactions between different modules or components of a relation extraction engine 124. As shown, a document 410 may be input into a tokenization component 400. The tokenization component 400 (also referred to as a "tokenizer") may split the document 410 into sentences so that it can be used along with a sentence-level relation extraction model later on.

In the case of a semi-structured document like the document 200 shown in FIG. 2, the relation extraction engine 124 may initially determine what text is present in the document or obtain information about the text in the document from another module, component, or subsystem of the natural language processing system 102. For example, the relation extraction engine 124 may perform optical character recognition (OCR) or otherwise obtain OCR results that indicate the textual elements ("spans") in the document 200. The OCR results may be tokenized, or the relation extraction engine 124 may tokenize the OCR results.

At block 306, the relation extraction engine 124 may extract or generate layout information from the document, if the document is a semi-structured document. In the example document 200 illustrated in FIG. 2, the relation extraction engine 124 may extract or generate spatial location information for any or all of the tokens. For example, the relation extraction engine 124 may determine x and y coordinates of each token according to a coordinate system in which the x value indicates a distance (in terms of pixels, inches, centimeters, etc.) from the left edge of the document and a y value that indicates a distance from the top edge of the document.

In some embodiments, the relation extraction engine 124 may also or alternatively extract or generate one or more visual properties of any or all of the tokens. For example, the relation extraction engine 124 may determine font size, font type, font alterations (e.g., bolding/underlining/italics/ strikethrough), font color, other properties, or any combination thereof.

At block 308, the relation extraction engine 124 may perform entity recognition on the tokens extracted from the document to identify entity mentions in order to identify relations between. Entity recognition may be performed using a named entity recognition model.

In some embodiments, a pretrained text encoder, such as Bidirectional Encoder Representations from Transformers (BERT) encoder or a Robustly Optimized BERT Pre-Training Approach (RoBERTa) encoder may be used to produce an encoded representation of the document and tokens therein. For example, a BERT or RoBERTa model may be used to generate encoded vectors referred to as embeddings. In some embodiments, a Label Semantics (LS) named entity recognition (NER) model may be used. The LS NER model may take into account label names for the entity types.

Once embeddings or other encoded representations of entities are generated, the relation extraction engine 124 may evaluate the embeddings with a sequence tagging decoder to tag entity mentions in a document. The tagged entity mentions may be referred to as entity data items. FIG. 4 illustrates a named entity recognition component 402 that is configured to receive tokens generated by the tokenization component 400, and provide a set of entity data items to subsequent components, such as the relation extraction component 404 and co-reference resolution component 406, as described in greater detail below.

At block 310, the relation extraction engine 124 may augment the entity data items with augmentation data that may be used accurately determine relations among the entities. Augmentation data may be or include data other than the text or other representations of the entities themselves, but which is nevertheless useful in determining relationships between entities.

In some embodiments, the augmentation data may represent or include the layout data generated above at block 306. For example, augmentation data may include spatial properties of the text corresponding to individual entities, visual font properties of the text corresponding to individual entities, other data, or some combination thereof.

In some embodiments, the augmentation data may represent or include information generated, obtained, or considered during the entity recognition process. For example, augmentation data may include a probability distribution across all entity types into which an entity may be classified, instead of or in addition to only the highest probably and therefore most likely entity type for each entity. As another example, augmentation data may include the top n entity types into which each entity has been determined to be classified.

The relation extraction engine 124 may include such augmentation data with the entity data items, also referred to as decorating the entity data items. For example, the relation extraction engine 124 may concatenate augmentation data with corresponding entity data items. As another example, the relation extraction engine 124 may generate a data structure in which one field or subset of fields is for an entity data item, and a different field or set of fields is for augmentation data that corresponds to the entity data item. In some embodiments, the augmentation data may be integrated into the entity data item in a way that is not completely or readily separable. For example, in the process of generating encoded representations of the text, the corresponding augmentation data may be input and encoded along with the text.

At block 312, the relation extraction engine 124 may determine relations among entities mentioned in the input text. In some embodiments, a relation extraction model may use mention pooling as part of the relation extraction process, and may perform pairwise relation classification for each pair of entities to determine whether they are related and, if so, the type of relationship. This configuration may be computationally efficient (e.g., low inference latency) while remaining very competitive in performance (e.g., accuracy in terms of precision and recall).

FIG. 4 illustrates an architecture that uses, which consists of three functional steps. First, an encoded representation (a fixed-dimension continuous vector, also referred to as an embedding) may be generated for each mention in the entity-tagged document or subset thereof (e.g., sentence) produced as described above. For example, a transformer model 440 (e.g., a transformer-type encoder such as BERT) may be used to generate the embeddings. In this example, the transformer model 440—which may be the same as, or different from, the transformer model used to generate embeddings for entity recognition—may only be run once for a document or subset thereof. Second, a mention pooling component 442 may concatenate the encoded representations of each pair of entity mentions 450 (e.g., <E1|E2>, . . . , <EN−1|EN> for N entities). Third, the concatenated entity mentions 450 may be evaluated using a relation classifier 444 (e.g., a neural network with one or more linear layers and a softmax) to predict one of the relation types (or "none" if no relation type).

At block 314, the relation extraction engine 124 may identify which entity mentions refer to the same entities. Such sets of entity mentions may be referred to as "co-reference" entities. Co-reference links pronominal and nominal mentions to the standard or "canonical" name mention (e.g., the longest name in the same document) of the real-world entity to which a group of mentions all refer. Determining co-reference entities can help users to obtain which real-world entities participate in each relation, as identified by their names. This can enable easier and more comprehensive use of the extracted relations in applications.

In some embodiments, co-reference resolution may be performed in a unidirectional manner on a string of text. The relation extraction engine 124 may evaluate entities from left to right in a text and, for each mention, determine whether the current mention is co-referent with a prior mention/cluster of mentions, or is an entirely new entity. For example, the co-reference resolution component 406 may iteratively work through the text from left to right, starting with a single entity and adding each additional entity one at a time. In each iteration, the relation extraction engine 124 may compare the added entity to the prior (more leftward) entities (e.g., by comparing embeddings generated using a transformer). Based upon the comparison (e.g., based on the positioning of the entities within the text, the nominal or pronominal nature of the entities, or other information encoded in the embeddings), the co-reference resolution component 406 can determine which of the previously-occurring entities (if any) the current entity is a co-referent. Such co-reference associations can be stored for subsequent steps or output.

Although block 314 is illustrated as being performed in parallel with blocks 310 and 312, the illustration is provided as an example implementation only, and is not intended to be limiting or required. In some embodiments, the relation extraction engine 124 may perform co-reference resolution before or after blocks 310 and/or 312.

At block 316, the relation extraction engine 124 can collate the results of the relation extraction and co-reference resolution processes. At this point, the relations determined by the relation extraction component 404, as well as the co-reference groups between entity mentions determined by the co-reference resolution component 406, have been obtained. Before the output is generated, co-reference groups may be attached to each entity mentions present in the relations extracted by the relation extraction component 404. As shown in FIG. 4, a collation component 408 may perform such collation. As a result of the collation, there may be multiple relation mentions referring to the same relational facts. In some embodiments, to address the duplicate data, a de-duplication process may be performed prior to generating output.

At block 318, the relation extraction engine 124 can generate output based on the relation extraction operations performed as described above. The output may be generated in the form of relation data 420, such as a set of relation data items. In some embodiments, relation data 420 may be a set of one or more multi-element data structures that include data regarding two entities and a relation that has been determined to exist between the two entities.

Referring to the example document 200 illustrated in FIG. 2, the relation extraction engine 124 may generate relation data 420 for entities "John Smith" (a "borrower" entity type), "Acme Staffing Solutions Inc." (an "employer" entity type), "123-45-6789" (a "SSN" entity type), "612.25" (an "income" entity type), and "38.02" (a "tax_withheld" entity type), among others. The relation data 420 may further indicate relations between the entities, such as <John Smith, has_employer, Acme Staffing Solutions Inc.>, <John Smith, has_income, 612.25>, <John Smith, has_SSN, 123-45-6789>, <John Smith, has_tax_withheld, 38.02>, and so on.

Example User Interfaces

Figure 5A:
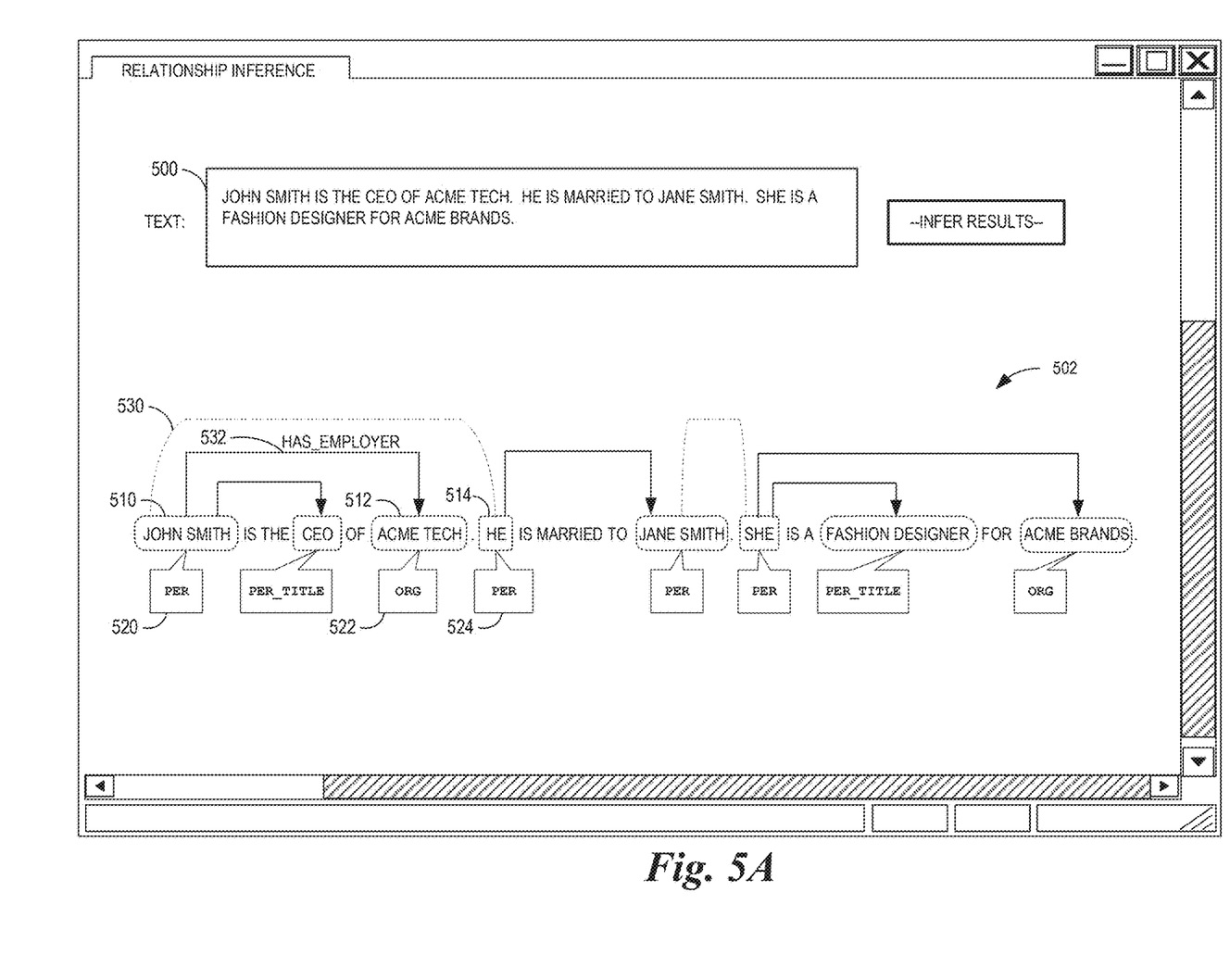
FIG. 5A is a user interface diagram illustrating output of a relation extraction operation according to some embodiments.

FIG. 5A illustrates an example interface that a user may access to process a document or other set of text and generate output indicating the entities and relations in the text. The user may type, copy, or upload the document into text area 500. Once the text has been provided, the user may initiate the relation extraction process by, for example, activating a command button. The relation extraction process may be performed as described in greater detail above to produce relation data 420. From the relation data, a graphical representation of the entities and relations may be generated and provided for presentation in the interface.

Presentation 502 shows the originally-provided text marked up with annotations for the entities detected, the relations between the entities, and co-reference entities. Various visual markups and connections may be used to indicate the determinations made by the relation extraction engine 124. In the illustrated example, entities are shown outlined with dotted lines, while relationships between entities are shown using solid lines having arrows that indicate the direction of the relationship. Entities 510 and 514 have both been classified as "PER" (person) entity types 520 and 524, while entity 512 has been classified as an "ORG" (organization) entity type 522. Entity 510 has been determined to have an "HAS_EMPLOYER" relationship 532 with entity 512. Furthermore, co-reference identification has resulted in entities 510 and 514 being determined to be the same entity, and the co-reference link is indicated using visual connection 530 (shown as a dashed line).

Figure 5B:
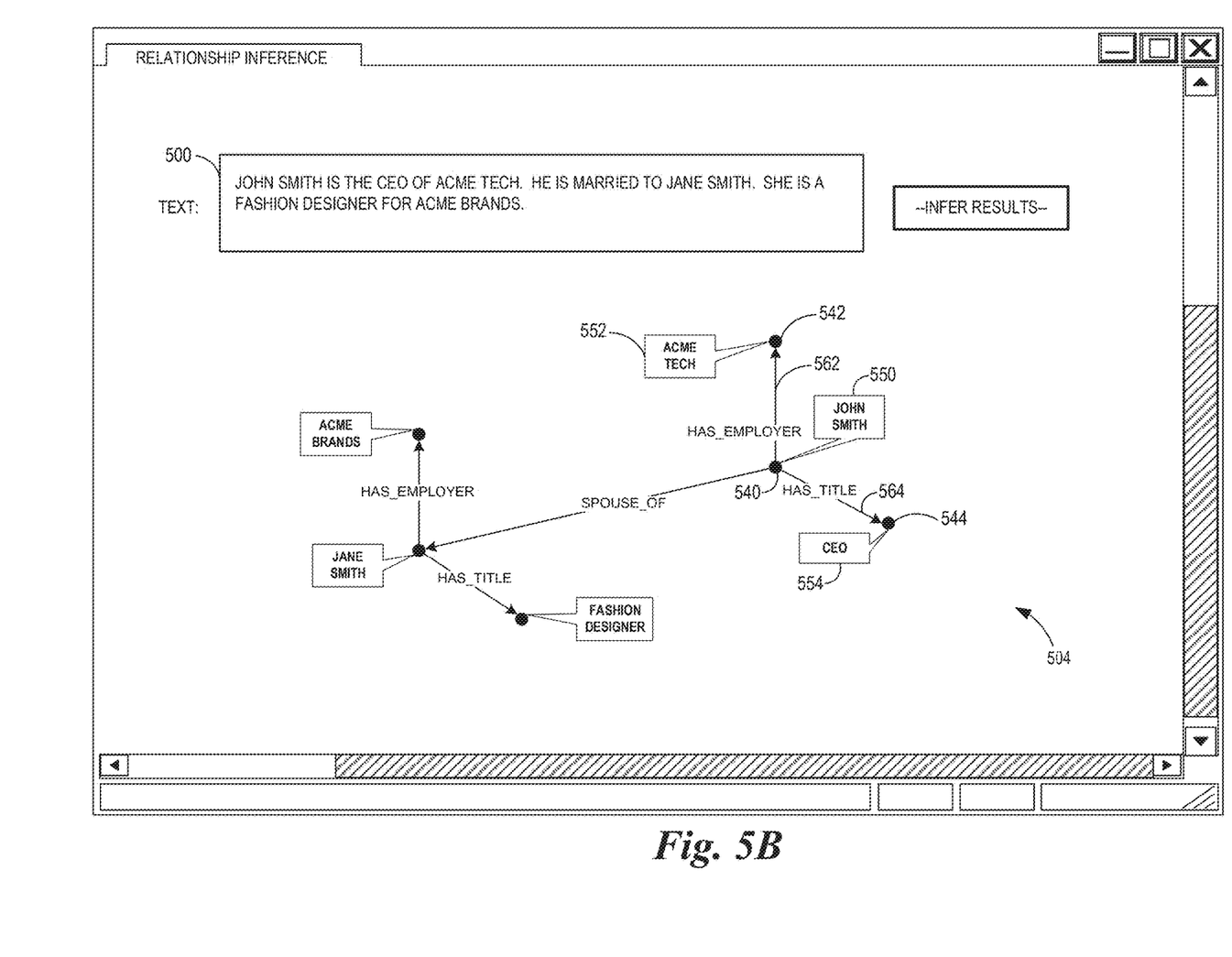
FIG. 5B is a user interface diagram illustrating output of a relation extraction operation according to some embodiments.

FIG. 5B illustrates an alterative presentation of results of a relation extraction process. Presentation 504 shows a graph data structure that visually represents the determined relations between entities. In presentation 504, the nodes of the graph data structure are indicative of entities, and the edges are indicative of relationships between the entities. The particular entities are shown labeled with balloons, while the relationships are labeled with text superimposed on the edges. In some embodiments, the graph data structure may be a directed graph in which some or all edges are directional to provide additional information regarding the relation represented by the edges.

In the illustrated example, node 540 corresponds to the person entity 550 labeled "John Smith." Node 542 corresponds to the organization entity 552 "Acme Tech." Node 544 corresponds to the position entity 554 "CEO." The relationship between person entity 550 and organization entity 552 is represented by edge 562, which is labeled with the relationship type "HAS_EMPLOYER." The relationship between person entity 550 and position entity 554 is represented by edge 564, which is labeled with the relationship type "HAS_TITLE." Note that in this example, co-referential entities have been fully resolved into nominal entities.

The example user interfaces shown in the figures and described herein are illustrative only, and are not intended to be limiting, required, or exhaustive. In some embodiments, additional and/or alternative user interfaces may be generated to display detected relations between entities. For example, entities and relations extracted from a text may be presented in a tabular form (e.g., entities are listed in one or more columns, and relations between them are indicated as data entered in the columns).

Example Computing Device

FIG. 6 illustrates an example computing device 600 that may be used in some embodiments to execute the processes and implement the features described above. For example, a computing device 600 may be used to implement a model training service 120, a relation extraction engine 124, other components of the natural language processing system 102, or a combination thereof.

A computing device 600 may include: one or more computer processors 602, such as physical central processing units (CPUs) or graphics processing units (GPUs); one or more network interfaces 604, such as a network interface cards (NICs); one or more computer readable medium drives 606, such as hard disk drives (HDDs), solid state drives (SSDs), flash drives, one or more input/output device interfaces 608; and/or other persistent non-transitory computer-readable media; and one or more computer readable memories 610, such as random access memory (RAM) and/or other volatile non-transitory computer-readable media. The network interface 604 can provide connectivity to one or more networks or computing devices. The computer processor 602 can receive information and instructions from other computing devices or services via the network interface 604. The network interface 604 can also store data directly to the computer-readable memory 610. The computer processor 602 can communicate to and from the computer-readable memory 610, execute instructions and process data in the computer-readable memory 610, etc.

The computer-readable memory 610 may include computer program instructions that the computer processor 602 executes in order to implement one or more embodiments. The computer-readable memory 610 can store an operating system 612 that provides computer program instructions for use by the computer processor 602 in the general administration and operation of the computing device 600. The computer-readable memory 610 can also include model training instructions 614 for implementing the model training features of the model training service 120. The computer-readable memory 610 can also relation extraction instructions 616 for implementing the relation extraction features of the relation extraction engine 124. The computer-readable memory 610 may also include one or more models 618 that are trained by the model training service 120 and/or used by the relation extraction engine 124.

Terminology and Additional Considerations

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
a training subsystem comprising one or more computing devices, wherein the training subsystem is configured to:
receive, from a user computing device, a corpus of annotated text documents, wherein individual text documents of the corpus of annotated text documents are annotated to indicate text spans corresponding to entities, entity types associated with the entities, and relations between the entities; and
train an entity recognition model and a relation extraction model using the corpus of annotated text documents; and
a relation extraction subsystem comprising one or more computing devices, wherein the relation extraction subsystem is configured to:
generate set of entity data items using the entity recognition model and text of a semi-structured document, wherein a first entity data item of the set of entity data items represents a first entity mention in the text, and wherein a second entity data item of the set of entity data items represents a second entity mention in the text;
generate augmentation data regarding one or more layout properties of the text;
generate a set of relation data items using the set of entity data items, the augmentation data, and the relation extraction model, where a first relation data item of the set of relation data items represents a relation between the first entity mention and the second entity mention; and
generate, using the set of relation data items, a user interface configured to present relations between entities in the text.

2. The system of claim 1, wherein the user interface comprises a graph comprising a plurality of nodes and a plurality of edges, wherein a first node of the plurality of nodes represents the first entity mention, wherein a second node of the plurality of nodes represents the second entity mention, and where an edge between the first node and the second node represents the relation between the first entity mention and the second entity mention.

3. The system of claim 1, wherein the relation extraction subsystem is further configured to:
determine a probability distribution of entity types with which the first entity mention is predicted to be associated; and
generate an input data structure for the relation extraction model, wherein the input data structure comprises an embedding vector representation of the first entity mention, and the probability distribution.

4. The system of claim 1, wherein the relation extraction subsystem is further configured to:
generate augmentation data representing at least one of: a spatial location of the first entity mention in the text, or a font property of the first entity mention in the text; and
generate an input data structure for the relation extraction model, wherein the set of entity data items comprises a set of embedding vectors, and wherein the input data structure comprises an embedding vector of the set of embedding vectors, and a portion of the augmentation data associated with the embedding vector.

5. A computer-implemented method comprising:
under control of a computing system comprising one or more computing devices configured to execute specific instructions:
generating a set of entity data items using an entity recognition model and text of a document, wherein a first entity data item of the set of entity data items represents a first entity mention in the text, and wherein a second entity data item of the set of entity data items represents a second entity mention in the text;
generating augmentation data regarding one or more layout properties of the text;
generating a set of relation data items using the set of entity data items, the augmentation data, and a relation extraction model, where a first relation data item of the set of relation data items represents a relation between the first entity mention and the second entity mention; and
generating, using the set of relation data items, a user interface configured to present relations between entities in the text.

6. The computer-implemented method of claim 5, further comprising determining a spatial location of the first entity mention in the text, wherein the augmentation data represents the spatial location.

7. The computer-implemented method of claim 5, further comprising determining a font property of the first entity mention in the text, wherein the augmentation data represents the font property.

8. The computer-implemented method of claim 5, further comprising receiving a semi-structured document within which relations are to be detected.

9. The computer-implemented method of claim 5, wherein generating the set of entity data items comprises generating a set of embedding vectors.

10. The computer-implemented method of claim 9, further comprising generating an input data structure for the relation extraction model, wherein the input data structure comprises an embedding vector of the set of embedding vectors, and a portion of the augmentation data associated with the embedding vector.

11. The computer-implemented method of claim 9, further comprising:
  determining a probability distribution of entity types with which the first entity mention is predicted to be associated; and
  generating an input data structure for the relation extraction model, wherein the input data structure comprises an embedding vector of the set of embedding vectors, and the probability distribution.

12. The computer-implemented method of claim 5, wherein generating the user interface comprises generating a graph comprising a plurality of nodes and a plurality of edges, wherein a first node of the plurality of nodes represents the first entity mention, wherein a second node of the plurality of nodes represents the second entity mention, and where an edge between the first node and the second node represents the relation between the first entity mention and the second entity mention.

13. The computer-implemented method of claim 5, further comprising resolving a reference to a same entity as the first entity mention using a co-reference resolution model.

14. The computer-implemented method of claim 5, further comprising:
  receiving, from a user computing device, a corpus of annotated text documents, wherein individual text documents of the corpus of annotated text documents are annotated to indicate which text spans correspond to entities, and relations between entities; and
  training at least one of the entity recognition model or the relation extraction model using the corpus of annotated text documents.

15. A system comprising:
  computer-readable memory; and
  one or more processors in communication with the computer-readable memory and configured by executable instructions to:
    generate a set of entity data items using an entity recognition model and text of a document, wherein a first entity data item of the set of entity data items represents a first entity mention in the text, and wherein a second entity data item of the set of entity data items represents a second entity mention in the text;
    generate augmentation data regarding one or more layout properties of the text;
    generate a set of relation data items using the set of entity data items, the augmentation data, and a relation extraction model, where a first relation data item of the set of relation data items represents a relation between the first entity mention and the second entity mention; and
    generate, using the set of relation data items, a user interface configured to present relations between entities in the text.

16. The system of claim 15, wherein the augmentation data represents at least one of: a spatial location of the first entity mention in the text, or a font property of the first entity mention in the text.

17. The system of claim 15, wherein the one or more processors are further configured by the executable instructions to generate an input data structure for the relation extraction model, wherein the set of entity data items comprises a set of embedding vectors, and wherein the input data structure comprises an embedding vector of the set of embedding vectors, and a portion of the augmentation data associated with the embedding vector.

18. The system of claim 15, wherein the one or more processors are further configured by the executable instructions to:
  generate the set of entity data items comprises generating a set of embedding vectors;
  determine a probability distribution of entity types with which the first entity mention is predicted to be associated; and
  generate an input data structure for the relation extraction model, wherein the input data structure comprises an embedding vector of the set of embedding vectors, and the probability distribution.

19. The system of claim 15, wherein the user interface comprises a graph comprising a plurality of nodes and a plurality of edges, wherein a first node of the plurality of nodes represents the first entity mention, wherein a second node of the plurality of nodes represents the second entity mention, and where an edge between the first node and the second node represents the relation between the first entity mention and the second entity mention.

20. The system of claim 15, wherein the one or more processors are further configured by the executable instructions to:
  obtain plain text from a second document;
  generate a second set of entity data items using the entity recognition model and the plain text, wherein a third entity data item of the second set of entity data items represents a third entity mention in the plain text, and wherein a fourth entity data item of the second set of entity data items represents a fourth entity mention in the plain text;
  generate a second set of relation data items using the second set of entity data items and the relation extraction model, where a second relation data item of the second set of relation data items represents a second relation between the third entity mention and the fourth entity mention; and
  generate, using the second set of relation data items, a second user interface configured to present relations between entities in the plain text.

* * * * *